(12) United States Patent
Byrd et al.

(10) Patent No.: US 7,903,568 B2
(45) Date of Patent: Mar. 8, 2011

(54) SYSTEMS AND METHODS FOR PROVIDING RECORDING AS A NETWORK SERVICE

(75) Inventors: Steve Byrd, Alpharetta, GA (US); John Bourne, Alpharetta, GA (US); Jamie Richard Williams, Alpharetta, GA (US); Dan Spohrer, Alpharetta, GA (US); Robert John Barnes, Watford (GB)

(73) Assignee: Verint Americas Inc., Melville, NY (US)

( * ) Notice: Subject to any disclaimer, the term of this patent is extended or adjusted under 35 U.S.C. 154(b) by 514 days.

(21) Appl. No.: 11/540,739

(22) Filed: Sep. 29, 2006

(65) Prior Publication Data

US 2008/0002719 A1    Jan. 3, 2008

Related U.S. Application Data

(60) Provisional application No. 60/817,630, filed on Jun. 29, 2006.

(51) Int. Cl.
*G01R 31/08* (2006.01)
*H04L 12/28* (2006.01)

(52) U.S. Cl. .................................... 370/250; 370/254

(58) Field of Classification Search ................ None
See application file for complete search history.

(56) References Cited

U.S. PATENT DOCUMENTS

| | | |
|---|---|---|
| 3,594,919 A | 7/1971 | De Bell et al. |
| 3,705,271 A | 12/1972 | De Bell et al. |
| 4,510,351 A | 4/1985 | Costello et al. |
| 4,684,349 A | 8/1987 | Ferguson et al. |
| 4,694,483 A | 9/1987 | Cheung |
| 4,763,353 A | 8/1988 | Canale et al. |
| 4,815,120 A | 3/1989 | Kosich |
| 4,924,488 A | 5/1990 | Kosich |
| 4,953,159 A | 8/1990 | Hayden et al. |
| 5,016,272 A | 5/1991 | Stubbs et al. |
| 5,101,402 A | 3/1992 | Chiu et al. |
| 5,117,225 A | 5/1992 | Wang |
| 5,210,789 A | 5/1993 | Jeffus et al. |
| 5,239,460 A | 8/1993 | LaRoche |
| 5,241,625 A | 8/1993 | Epard et al. |
| 5,267,865 A | 12/1993 | Lee et al. |

(Continued)

FOREIGN PATENT DOCUMENTS

EP    0453128 A2    10/1991

(Continued)

OTHER PUBLICATIONS

Notification of Transmittal of the International Search Report and the Written Opinion of the International Searching Authority, dated Jun. 6, 2008.

(Continued)

*Primary Examiner* — Hong Cho
*Assistant Examiner* — Eunsook Choi
(74) *Attorney, Agent, or Firm* — Lawrence A. Aaronson, PC

(57) ABSTRACT

Systems and methods for providing recording of communications are provided. A representative method incorporates: providing recording as a service on a network such that: the network determines whether Internet Protocol (IP) packets, which are being communicated by the network, are associated with a communication that is to be recorded and the network directs information corresponding to the IP packets associated with the communication to a long term storage device.

25 Claims, 5 Drawing Sheets

U.S. PATENT DOCUMENTS

| | | | |
|---|---|---|---|
| 5,299,260 | A | 3/1994 | Shaio |
| 5,311,422 | A | 5/1994 | Loftin et al. |
| 5,315,711 | A | 5/1994 | Barone et al. |
| 5,317,628 | A | 5/1994 | Misholi et al. |
| 5,347,306 | A | 9/1994 | Nitta |
| 5,388,252 | A | 2/1995 | Dreste et al. |
| 5,396,371 | A | 3/1995 | Henits et al. |
| 5,432,715 | A | 7/1995 | Shigematsu et al. |
| 5,465,286 | A | 11/1995 | Clare et al. |
| 5,475,625 | A | 12/1995 | Glaschick |
| 5,485,569 | A | 1/1996 | Goldman et al. |
| 5,491,780 | A | 2/1996 | Fyles et al. |
| 5,499,291 | A | 3/1996 | Kepley |
| 5,535,256 | A | 7/1996 | Maloney et al. |
| 5,572,652 | A | 11/1996 | Robusto et al. |
| 5,577,112 | A | 11/1996 | Cambray et al. |
| 5,590,171 | A | 12/1996 | Howe et al. |
| 5,597,312 | A | 1/1997 | Bloom et al. |
| 5,619,183 | A | 4/1997 | Ziegra et al. |
| 5,696,906 | A | 12/1997 | Peters et al. |
| 5,717,879 | A | 2/1998 | Moran et al. |
| 5,721,842 | A | 2/1998 | Beasley et al. |
| 5,742,670 | A | 4/1998 | Bennett |
| 5,748,499 | A | 5/1998 | Trueblood |
| 5,778,182 | A | 7/1998 | Cathey et al. |
| 5,784,452 | A | 7/1998 | Carney |
| 5,790,798 | A | 8/1998 | Beckett, II et al. |
| 5,796,952 | A | 8/1998 | Davis et al. |
| 5,809,247 | A | 9/1998 | Richardson et al. |
| 5,809,250 | A | 9/1998 | Kisor |
| 5,825,869 | A | 10/1998 | Brooks et al. |
| 5,835,572 | A | 11/1998 | Richardson, Jr. et al. |
| 5,862,330 | A | 1/1999 | Anupam et al. |
| 5,864,772 | A | 1/1999 | Alvarado et al. |
| 5,884,032 | A | 3/1999 | Bateman et al. |
| 5,907,680 | A | 5/1999 | Nielsen |
| 5,918,214 | A | 6/1999 | Perkowski |
| 5,923,746 | A | 7/1999 | Baker et al. |
| 5,933,811 | A | 8/1999 | Angles et al. |
| 5,944,791 | A | 8/1999 | Scherpbier |
| 5,948,061 | A | 9/1999 | Merriman et al. |
| 5,958,016 | A | 9/1999 | Chang et al. |
| 5,964,836 | A | 10/1999 | Rowe et al. |
| 5,978,648 | A | 11/1999 | George et al. |
| 5,982,857 | A | 11/1999 | Brady |
| 5,987,466 | A | 11/1999 | Greer et al. |
| 5,990,852 | A | 11/1999 | Szamrej |
| 5,991,373 | A | 11/1999 | Pattison et al. |
| 5,991,796 | A | 11/1999 | Anupam et al. |
| 6,005,932 | A | 12/1999 | Bloom |
| 6,009,429 | A | 12/1999 | Greer et al. |
| 6,014,134 | A | 1/2000 | Bell et al. |
| 6,014,647 | A | 1/2000 | Nizzari et al. |
| 6,018,619 | A | 1/2000 | Allard et al. |
| 6,035,332 | A | 3/2000 | Ingrassia, et al. |
| 6,038,544 | A | 3/2000 | Machin et al. |
| 6,039,575 | A | 3/2000 | L'Allier et al. |
| 6,057,841 | A | 5/2000 | Thurlow et al. |
| 6,058,163 | A | 5/2000 | Pattison et al. |
| 6,061,798 | A | 5/2000 | Coley et al. |
| 6,072,860 | A | 6/2000 | Kek et al. |
| 6,076,099 | A | 6/2000 | Chen et al. |
| 6,078,894 | A | 6/2000 | Clawson et al. |
| 6,091,712 | A | 7/2000 | Pope et al. |
| 6,108,711 | A | 8/2000 | Beck et al. |
| 6,122,665 | A | 9/2000 | Bar et al. |
| 6,122,668 | A | 9/2000 | Teng et al. |
| 6,130,668 | A | 10/2000 | Stein |
| 6,138,139 | A | 10/2000 | Beck et al. |
| 6,144,991 | A | 11/2000 | England |
| 6,146,148 | A | 11/2000 | Stuppy |
| 6,151,622 | A | 11/2000 | Fraenkel et al. |
| 6,154,771 | A | 11/2000 | Rangan et al. |
| 6,157,808 | A | 12/2000 | Hollingsworth |
| 6,171,109 | B1 | 1/2001 | Ohsuga |
| 6,182,094 | B1 | 1/2001 | Humpleman et al. |
| 6,195,679 | B1 | 2/2001 | Bauersfeld et al. |
| 6,201,948 | B1 | 3/2001 | Cook et al. |
| 6,211,451 | B1 | 4/2001 | Tohgi et al. |
| 6,225,993 | B1 | 5/2001 | Lindblad et al. |
| 6,230,197 | B1 | 5/2001 | Beck et al. |
| 6,236,977 | B1 | 5/2001 | Verba et al. |
| 6,244,758 | B1 | 6/2001 | Solymar et al. |
| 6,282,548 | B1 | 8/2001 | Burner et al. |
| 6,286,030 | B1 | 9/2001 | Wenig et al. |
| 6,286,046 | B1 | 9/2001 | Bryant |
| 6,288,753 | B1 | 9/2001 | DeNicola et al. |
| 6,289,340 | B1 | 9/2001 | Purnam et al. |
| 6,301,462 | B1 | 10/2001 | Freeman et al. |
| 6,301,573 | B1 | 10/2001 | McIlwaine et al. |
| 6,324,282 | B1 | 11/2001 | McIlwaine et al. |
| 6,347,374 | B1 | 2/2002 | Drake et al. |
| 6,351,467 | B1 | 2/2002 | Dillon |
| 6,353,851 | B1 | 3/2002 | Anupam et al. |
| 6,360,250 | B1 | 3/2002 | Anupam et al. |
| 6,370,574 | B1 | 4/2002 | House et al. |
| 6,404,857 | B1 | 6/2002 | Blair et al. |
| 6,411,989 | B1 | 6/2002 | Anupam et al. |
| 6,418,471 | B1 | 7/2002 | Shelton et al. |
| 6,459,787 | B2 | 10/2002 | McIlwaine et al. |
| 6,487,195 | B1 | 11/2002 | Choung et al. |
| 6,493,758 | B1 | 12/2002 | McLain |
| 6,502,131 | B1 | 12/2002 | Vaid et al. |
| 6,510,220 | B1 | 1/2003 | Beckett, II et al. |
| 6,535,909 | B1 | 3/2003 | Rust |
| 6,542,602 | B1 | 4/2003 | Elazar |
| 6,546,405 | B2 | 4/2003 | Gupta et al. |
| 6,560,328 | B1 | 5/2003 | Bondarenko et al. |
| 6,583,806 | B2 | 6/2003 | Ludwig et al. |
| 6,606,657 | B1 | 8/2003 | Zilberstein et al. |
| 6,665,644 | B1 | 12/2003 | Kanevsky et al. |
| 6,674,447 | B1 | 1/2004 | Chiang et al. |
| 6,683,633 | B2 | 1/2004 | Holtzblatt et al. |
| 6,697,858 | B1 | 2/2004 | Ezerzer et al. |
| 6,724,887 | B1 | 4/2004 | Eilbacher et al. |
| 6,738,456 | B2 | 5/2004 | Wrona et al. |
| 6,757,361 | B2 | 6/2004 | Blair et al. |
| 6,772,396 | B1 | 8/2004 | Cronin et al. |
| 6,775,377 | B2 | 8/2004 | McIlwaine et al. |
| 6,792,575 | B1 | 9/2004 | Samaniego et al. |
| 6,810,414 | B1 | 10/2004 | Brittain |
| 6,820,083 | B1 | 11/2004 | Nagy et al. |
| 6,823,384 | B1 | 11/2004 | Wilson et al. |
| 6,870,916 | B2 | 3/2005 | Henrikson et al. |
| 6,871,229 | B2 | 3/2005 | Nisani et al. |
| 6,901,438 | B1 | 5/2005 | Davis et al. |
| 6,959,078 | B1 | 10/2005 | Eilbacher et al. |
| 6,965,886 | B2 | 11/2005 | Govrin et al. |
| 2001/0000962 | A1 | 5/2001 | Rajan |
| 2001/0032335 | A1 | 10/2001 | Jones |
| 2001/0043697 | A1 | 11/2001 | Cox et al. |
| 2002/0038363 | A1 | 3/2002 | MacLean |
| 2002/0052948 | A1 | 5/2002 | Baudu et al. |
| 2002/0065911 | A1 | 5/2002 | Von Klopp et al. |
| 2002/0065912 | A1 | 5/2002 | Catchpole et al. |
| 2002/0128925 | A1 | 9/2002 | Angeles |
| 2002/0143925 | A1 | 10/2002 | Pricer et al. |
| 2002/0165954 | A1 | 11/2002 | Eshghi et al. |
| 2003/0055883 | A1 | 3/2003 | Wiles et al. |
| 2003/0079020 | A1 | 4/2003 | Gourraud et al. |
| 2003/0144900 | A1 | 7/2003 | Whitmer |
| 2003/0154240 | A1 | 8/2003 | Nygren et al. |
| 2004/0100507 | A1 | 5/2004 | Hayner et al. |
| 2004/0111473 | A1 | 6/2004 | Lysenko et al. |
| 2004/0165717 | A1 | 8/2004 | McIlwaine et al. |
| 2004/0207724 | A1 | 10/2004 | Crouch et al. |
| 2005/0018622 | A1* | 1/2005 | Halbraich et al. ............ 370/260 |
| 2005/0108518 | A1 | 5/2005 | Pandya et al. |
| 2005/0135609 | A1 | 6/2005 | Lee et al. |
| 2006/0168234 | A1 | 7/2006 | Safstrom et al. |
| 2006/0203807 | A1* | 9/2006 | Kouretas et al. ............ 370/352 |
| 2006/0268847 | A1* | 11/2006 | Halbraich et al. ............ 370/352 |
| 2007/0019634 | A1* | 1/2007 | Fisher et al. ................. 370/352 |
| 2007/0263603 | A1* | 11/2007 | Schmitt ........................ 370/356 |
| 2009/0016522 | A1 | 1/2009 | Torres et al. |

FOREIGN PATENT DOCUMENTS

| | | |
|---|---|---|
| EP | 0773687 A2 | 5/1997 |
| EP | 0989720 | 3/2000 |
| GB | 2369263 | 5/2002 |
| WO | WO 98/43380 | 11/1998 |
| WO | WO 00/16207 | 3/2000 |

OTHER PUBLICATIONS

"Setting up switched port analyzer for monitoring and recording IP-ICD agents on the Cisco ICS 7750", Cisco Systems, Nov. 22, 2002. http://www.cisco.com/en/US/docs/routers/access/ics7750/software/notes/icsspan.html.

"NICE announces the next generation of active VoIP recording solutions", Press Release, NICE Systems, Mar. 14, 2006. http://www.nice.com/news/show_pr.php?id=581.

"NICE Systems announces interoperability of its VoIP recording technology with Cisco Systems' customer contact software platform", Business Wire, Jul. 3, 2001. http://findarticles.com/p/articles/mi_m0EIN/is_2001_July_3/ai_76154034.

"NICE and Cisco ICM/IPCC integration", (Feb. 2003). http://www.cisco.com/en/US/solutions/collateral/ns340/ns394/ns165/ns45/ns14/net_brochure09186a00800a3292.pdf.

"Customer Spotlight: Navistar International," Web pae, unverified print date of Apr. 1, 2002.

"DKSystems Integrates QM Perception with OnTrack for Training," Web page, unvereified print date of Apr. 1, 2002, unverified cover date of Jun. 15, 1999.

"OnTrack Online Delivers New Web Functionality," Web page, unverified print date of Apr. 2, 2002, unverified cover date of Oct. 5, 1999.

"PriceWaterouseCoopers Case Study The Business Challenge," Web page, unverified cover date of 2000.

Abstract, net.working: "An Online Webliography," *Technical Training* pp. 4-5 (Nov.-Dec. 1998).

Adams et al., "Our Turn-of-the-Century Trend Watch" *Technical Training* pp. 46-47 (Nov./Dec. 1998).

Barron, "The Road to Performance: Three Vignettes," *Technical Skills and Training* pp. 12-14 (Jan. 1997).

Bauer, "Technology Tools: Just-in-Time Desktop Training is Quick, Easy, and Affordable," *Technical Training* pp. 8-11 (May/Jun. 1998).

Beck et al., "Applications of A1 in Education," *AMC Crossroads* vol. 1: 1-13 (Fall 1996) Web page, unverified print date of Apr. 12, 2002.

Benson and Cheney, "Best Practices in Training Delivery," *Technical Training* pp. 14-17 (Oct. 1996).

Bental and Cawsey, "Personalized and Adaptive Systems for Medical Consumer Applications," Communications ACM 45(5): 62-63 (May 2002).

Benyon and Murray, "Adaptive Systems: from intelligent tutoring to autonomous agents," pp. 1-52, Web page, unknown date.

Blumenthal et al., "Reducing Development Costs with Intelligent Tutoring System Shells," pp. 1-5, Web page, unverified print date of Apr. 9, 2002, unverified cover date of Jun. 10, 1996.

Brusilosy et al., "Distributed intelligent tutoring on the Web," Proceedings of the 8th World Conference of the AIED Society, Kobe, Japan, Aug. 18-22, pp. 1-9 Web page, unverified print date of Apr. 12, 2002, unverified cover date of Aug. 18-22, 1997.

Brusilovsky and Pesin, ISIS-Tutor: An Intelligent Learning Environment for CD/ISIS Users, @ pp. 1-15 Web page, unverified print date of May 2, 2002.

Brusilovsky, "Adaptive Educational Systems on the World-Wide-Web: A Review of Available Technologies," pp. 1-10, Web Page, unverified print date of Apr. 12, 2002.

Byrnes et al., "The Development of a Multiple-Choice and True-False Testing Environment on the Web," pp. 1-8, Web page, unverified print date of Apr. 12, 2002, unverified cover date of 1995.

Calvi and DeBra, "Improving the Usability of Hypertext Courseware through Adaptive Linking," *ACM*, unknown page numbers (1997).

Coffey, "Are Performance Objectives Really Necessary?" *Technical Skills and Training* pp. 25-27 (Oct. 1995).

Cohen, "Knowledge Management's Killer App," pp. 1-11, Web page, unverified print date of Sep. 12, 2002, unverified cover date of 2001.

Cole-Gomolski, "New Ways to manage E-Classes," *Computerworld* 32(48):4344 (Nov. 30, 1998).

Cross: "Sun Microsystems—the SunTAN Story," Internet Time Group 8 (©2001).

Cybulski and Linden, "Teaching Systems Analysis and Design Using Multimedia and Patterns," unknown date, unknown source.

De Bra et al., "Adaptive Hypermedia: From Systems to Framework," *ACM* (2000).

De Bra, "Adaptive Educational Hypermedia on the Web," *Communications ACM* 45(5):60-61 (May 2002).

Dennis and Gruner, "Computer Managed Instruction at Arthur Andersen & Company: A Status Report," *Educational Technical* pp. 7-16 (Mar. 1992).

Diessel et al., "Individualized Course Generation: A Marriage Between CAL and ICAL," *Computers Educational* 22(1/2) 57-65 (1994).

Dyreson, "An Experiment in Class Management Using the World-Wide Web," pp. 1-12, Web page, unverified print date of Apr. 12, 2002.

E Learning Community, "Excellence in Practice Award: Electronic Learning Technologies," *Personal Learning Network* pp. 1-11, Web page, unverified print date of Apr. 12, 2002.

Eklund and Brusilovsky, "The Value of Adaptivity in Hypermedia Learning Environments: A Short Review of Empirical Evidence," pp. 1-8, Web page, unverified print date of May 2, 2002.

*e-Learning the future of learning*, THINQ Limited, London, Version 1.0 (2000).

Eline, "A Trainer's Guide to Skill Building," *Technical Training* pp. 34-41 (Sep./Oct. 1998).

Eline, "Case Study: Briding the Gap in Canada's IT Skills," *Technical Skills and Training* pp. 23-25 (Jul. 1997).

Eline "Case Study: IBT's Place in the Sun," *Technical Training* pp. 12-17 (Aug./Sep. 1997).

Fritz, "CB templates for productivity: Authoring system templates for trainers," *Emedia Professional* 10(8):6678 (Aug. 1997).

Fritz, "ToolBook II: Asymetrix's updated authoring software tackles the Web," *Emedia Professional* 10(20): 102106 (Feb. 1997).

Gibson et al., "A Comparative Analysis of Web-Based Testing and Evaluation Systems," pp. 1-8, Web page, unverified print date of Apr. 11, 2002.

Halberg and DeFiore, "Curving Toward Performance: Following a Hierarchy of Steps Toward a Performance Orientation," *Technical Skills and Training* pp. 9-11 (Jan. 1997).

Harsha, "Online Training 'Sprints' Ahead," *Technical Training* pp. 27-29 (Jan./Feb. 1999).

Heideman, "Training Technicians for a High-Tech Future: These six steps can help develop technician training for high-tech work," pp. 11-14 (Feb./Mar. 1995).

Heideman, "Writing Performance Objectives Simple as A-B-C (and D)," *Technical Skills and Training* pp. 5-7 (May/Jun. 1996).

Hollman, "Train Without Pain: The Benefits of Computer-Based Training Tools," pp. 1-11, Web page, unverified print date of Mar. 20, 2002, unverified cover date of Jan. 1, 2000.

Klein, "Command Decision Training Support Technology," Web page, unverified print date of Apr. 12, 2002.

Koonce, "Where Technology and Training Meet," *Technical Training* pp. 10-15 (Nov./Dec. 1998).

Kursh, "Going the distance with Web-based training," *Training and Development* 52(3): 5053 (Mar. 1998).

Larson, "Enhancing Performance Through Customized Online Learning Support," *Technical Skills and Training* pp. 25-27 (May/Jun. 1997).

Linton, et al. "OWL: A Recommender System for Organization-Wide Learning," *Educational Technical Society* 3(1): 62-76 (2000).

Lucadamo and Cheney, "Best Practices in Technical Training," *Technical Training* pp. 21-26 (Oct. 1997).

McNamara, "Monitoring Solutions: Quality Must be Seen and Heard," *Inbound/Outbound* pp. 66-67 (Dec. 1989).

Merrill, "The New Component Design Theory: Instruction design for courseware authoring," *Instructional Science* 16:19-34 (1987).

Minton-Eversole, "IBT Training Truths Behind the Hype," *Technical Skills and Training* pp. 15-19 (Jan. 1997).

Mizoguchi, "Intelligent Tutoring Systems: The Current State of the Art," Trans. IEICE E73(3):297-307 (Mar. 1990).
Mostow and Aist, "The Sounds of Silence: Towards Automated Evaluation of Student Learning a Reading Tutor that Listens" *American Association for Artificial Intelligence*, Web page, unknown date Aug. 1997.
Mullier et al., "A Web base Intelligent Tutoring System," pp. 1-6, Web page, unverified print date of May 2, 2002.
Nash, Database Marketing, 1993, pp. 158-165, 172-185, McGraw Hill, Inc. USA.
Nelson et al. "The Assessment of End-User Training Needs," *Communications ACM* 38(7):27-39 (Jul. 1995).
O'Herron, "CenterForce Technologies' CenterForce Analyzer," Web page unverified print date of Mar. 2, 2002, unverified cover date of Jun. 1, 1999.
O'Roark, "Basic Skills Get a Boost," Technical Training pp. 10-13 (Jul./Aug. 1998).
Pamphlet, On Evaluating Educational Innovations[1], authored by Alan Lesgold, unverified cover date of Mar. 5, 1998.
Papa et al., "A Differential Diagnostic Skills Assessment and Tutorial Tool," *Computer Education* 18(1-3):45-50 (1992).
PCT International Search Report, International Application No. PCT/US03/02541, mailed May 12, 2003.
Phaup, "New Software Puts Computerized Tests on the Internet: Presence Corporation announces breakthrough Question Mark™ Web Product," Web page, unverified print date of Apr. 1, 2002.
Phaup, "QM Perception™ Links with Integrity Training's WBT Manager™ to Provide Enhanced Assessments of Web-Based Courses," Web page, unverified print date of Apr. 1, 2002, unverified cover date of Mar. 25, 1999.
Phaup, "Question Mark Introduces Access Export Software," Web page, unverified print date of Apr. 2, 2002, unverified cover date of Mar. 1, 1997.
Phaup, "Question Mark Offers Instant Online Feedback for Web Quizzes and Questionnaires: University of California assist with Beta Testing, Server scripts now available on high-volume users," Web page, unverified print date of Apr. 1, 2002, unverified cover date of May 6, 1996.
Piskurich, Now-You-See-'Em, Now-You-Don't Learning Centers, *Technical Training* pp. 18-21 (Jan./Feb. 1999).
Read, "Sharpening Agents' Skills," pp. 1-15, Web page, unverified print date of Mar. 20, 2002, unverified cover date of Oct. 1, 1999.
Reid, "On Target: Assessing Technical Skills," *Technical Skills and Training* pp. 6-8 (May/Jun. 1995).
Stormes, "Case Study: Restructuring Technical Training Using ISD," *Technical Skills and Training* pp. 23-26 (Feb./Mar. 1997).
Tennyson, "Artificial Intelligence Methods in Computer-Based Instructional Design," Journal of Instructional Development 7(3): 17-22 (1984).
The Editors, Call Center, "The Most Innovative Call Center Products We Saw in 1999," Web page, unverified print date of Mar. 20, 2002, unverified cover date of Feb. 1, 2000.
Tinoco et al., "Online Evaluation in WWW-based Courseware," *ACM* pp. 194-198 (1997).
Uiterwijk et al., "The virtual classroom," *InfoWorld* 20(47):6467 (Nov. 23, 1998).
Unknown Author, "Long-distance learning," *InfoWorld* 20(36):7676 (1998).
Untitled, 10th Mediterranean Electrotechnical Conference vol. 1 pp. 124-126 (2000).
Watson and Belland, "Use of Learner Data in Selecting Instructional Content for Continuing Education," *Journal of Instructional Development* 8(4):29-33 (1985).
Weinschenk, "Performance Specifications as Change Agents," *Technical Training* pp. 12-15 (Oct. 1997).
Witness Systems promotional brochure for eQuality entitled "Bringing eQuality to Business".
Witness Systems promotional brochure for eQuality entitled "Building Customer Loyalty Through Business-Driven Recording of Multimedia Interactions in your Contact Center," (2000).
Aspect Call Center Product Specification, "Release 2.0", Aspect Telecommuications Corporation, May 23, 1998 798.
Metheus X Window Record and Playback, XRP Features and Benefits, 2 pages Sep. 1994 LPRs.
"Keeping an Eye on Your Agents," Call Center Magazine, pp. 32-34, Feb. 1993 LPRs & 798.
Anderson: Interactive TVs New Approach, The Standard, Oct. 1, 1999.
Ante, *Everything You Ever Wanted to Know About Cryptography Legislation . . . (But Were to Sensible to Ask)*, PC world Online, Dec. 14, 1999.
Berst. *It's Baa-aack. How Interative TV is Sneaking Into Your Living Room*, The AnchorDesk, May 10, 1999.
Berst. *Why Interactive TV Won't Turn You On (Yet)*, The AnchorDesk, Jul. 13, 1999.
Borland and Davis. *US West Plans Web Services on TV*, CNETNews.com, Nov. 22, 1999.
Brown. *Let PC Technology Be Your TV Guide*, PC Magazine, Jun. 7, 1999.
Brown. *Interactive TV: The Sequel*, NewMedia, Feb. 10, 1998.
Cline. *Déjà vu—Will Interactive TV Make It This Time Around?*, DevHead, Jul. 9, 1999.
Crouch. *TV Channels on the Web*, PC World, Sep. 15, 1999.
D'Amico. *Interactive TV Gets $99 set-top box*, IDG.net, Oct. 6, 1999.
Davis. *Satellite Systems Gear Up for Interactive TV Fight*, CNETNews.com, Sep. 30, 1999.
Diederich. *Web TV Data Gathering Raises Privacy Concerns*, ComputerWorld, Oct. 13, 1998.
*Digital Broadcasting*, Interactive TV News.
*EchoStar, MediaX Mix Interactive Multimedia With Interactive Television*, PRNews Wire, Jan. 11, 1999.
Furger. *The Internet Meets the Couch Potato*, PCWorld, Oct. 1996.
*Hong Kong Comes First with Interactive TV*, Sci-Tech, Dec. 4, 1997.
*Interactive TV Overview TimeLine*, Interactive TV News.
*Interactive TV Wars Heat Up*, Industry Standard.
Needle. *Will The Net Kill Network TV?* PC World Online, Mar. 10, 1999.
Kane. *AOL-Tivo: You've Got Interactive TV*, ZDNN, Aug. 17, 1999.
Kay. *E-Mail in Your Kitchen*, PC World Online, 093/28/96.
Kenny. *TV Meets Internet*, PC World Online, Mar. 28, 1996.
Linderholm. *Avatar Debuts Home Theater PC, PC* World Online, Dec. 1, 1999.
Mendoza. *Order Pizza WhileYyou Watch*, ABCNews.com.
Moody. *WebTV: What the Big Deal?*, ABCNews.com.
Murdorf, et al. *Interactive Television—Is There Life After the Internet?*, Interactive TV News.
Needle. *PC, TV or Both?*, PC World Online.
*Interview with Steve Perlman*, CEO of Web-TV Networks, PC World Online.
Press. *Two Cultures, The Internet and Interactive TV*, Universite de Montreal.
Reuters. *Will TV Take Over Your PC?*, PC World Online.
Rohde. *Gates Touts Interactive TV*, InfoWorld, Oct. 14, 1999.
Ross. *Broadcasters Use TV Signals to Send Data*, PC World Oct. 1996.
Schlisserman. *Is Web TV a Lethal Weapon?*, PC World Online.
Stewart. *Interactive Television at Home: Television Meets the Internet*, Aug. 1998.
Swedlow. *Computer TV Shows: Ready for Prime Time?*, PC World Online.
Wilson. *U.S. West Revisits Interactive TV*, Interactive Week, Nov. 28, 1999.
Notification Concerning Transmittal of International Preliminary Report on Patentability and Written Opinion of the International Searching Authority, dated Apr. 9, 2009.

* cited by examiner

SYSTEMS AND METHODS FOR PROVIDING RECORDING AS A NETWORK SERVICE

CROSS REFERENCE TO RELATED APPLICATIONS

This application is a utility application that is based on and claims priority to U.S. Provisional Application Ser. No. 60/817,630, filed on Jun. 29, 2006, and which is incorporated by reference herein.

BACKGROUND

Recording of communications is important to many industries, particularly those in which compliance regulations have been implemented. In this regard, a traditional passive tap Internet Protocol (IP) recording technique includes recorders that are deployed along routes of communications. In this technique, each recorder operates similar to a "sniffer" by analyzing pass-by communication IP packets. Each recorder detects the packets corresponding to certain communication sessions, locally stores the sessions by gathering the corresponding packets, and then directs the recorded sessions to long term storage. Clearly, interfacing such recorders with the communication network in the proper locations is required to ensure that the desired communications are detected and ultimately recorded.

SUMMARY

Systems and methods for providing recording as a network service are provided. In this regard, an embodiment of such a system comprises a switching device operative to: communicate Internet Protocol (IP) packets of a network with which the switching device is associated; determine which of the IP packets communicated by the switching device are associated with a communication that is to be recorded; and direct information corresponding to the IP packets associated with the communication to a long term storage device. The switching device is a network infrastructure component configured for directing IP packets.

An embodiment of such a method comprises: providing recording as a service on a network such that: the network determines whether Internet Protocol (IP) packets, which are being communicated by the network, are associated with a communication that is to be recorded and the network directs information corresponding to the IP packets associated with the communication to a long term storage device.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

As will be described here with reference to several exemplary embodiments, systems and methods for providing recording as a network service are provided. In this regard, some embodiments of such a system involve the use of switching devices, e.g., network switches, network routers and/or other components that form the infrastructure of many communication networks, such as the World Wide Web. Specifically, in these embodiments, the switching devices themselves are capable of performing various functionality that conventionally is provided by recorders, which typically tap into a network, e.g., at a switching device, in order to record communications.

Figure 1:
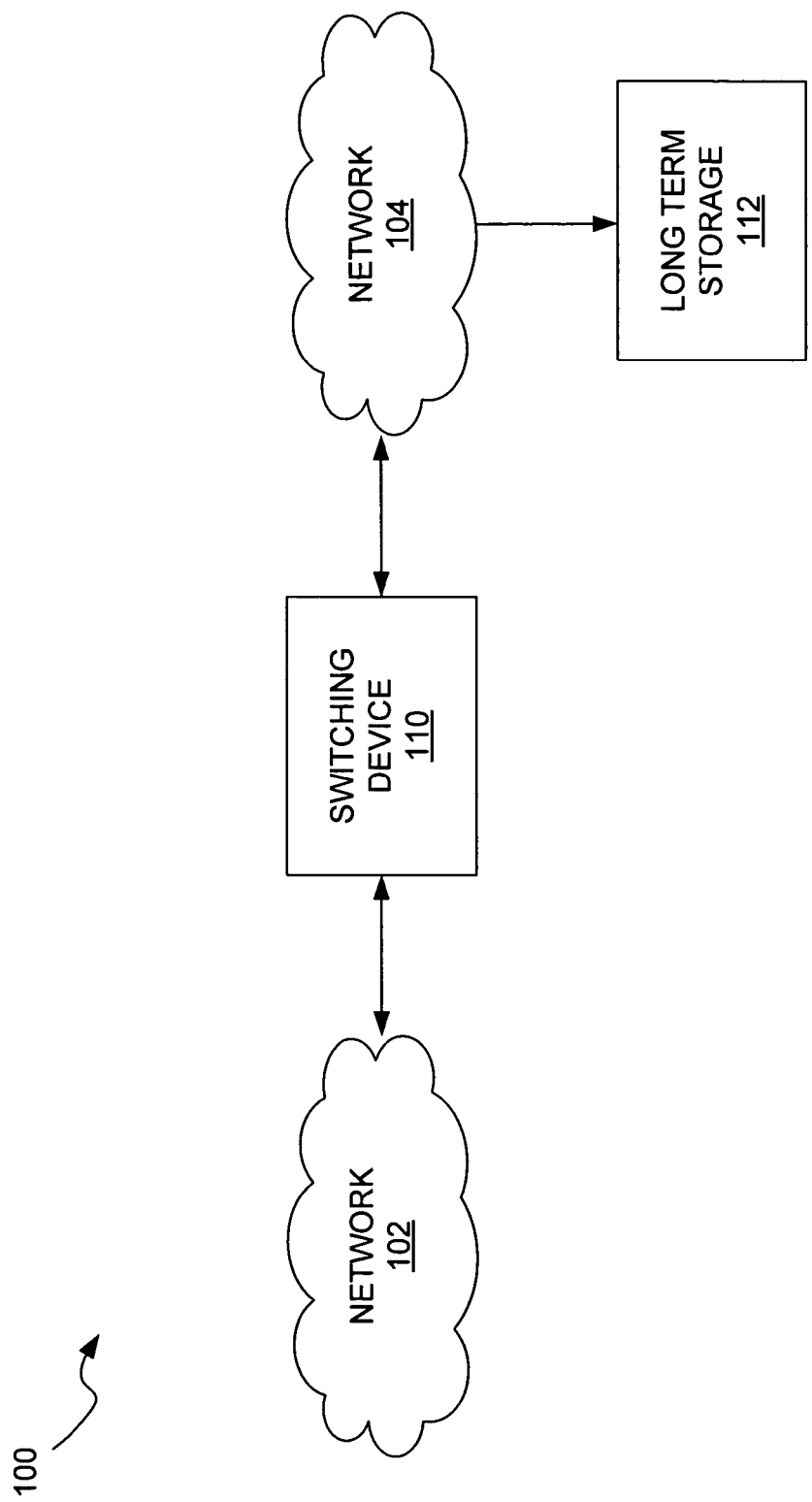
FIG. 1 is a schematic diagram illustrating an exemplary embodiment of a system for providing recording as a network service.

Referring now in detail to the drawings, FIG. 1 is a schematic diagram illustrating an exemplary embodiment of a system for providing recording as a network service. As shown in FIG. 1, system 100 incorporates communications networks 102 and 104. Each of these networks can be any or a combination of network types (WAN, LAN, the Internet) for providing Internet Protocol (IP) communications.

Communicating with each of networks 102 and 104 is a network switching device 110 that can be used for directing IP packets, such as directing IP packets between the networks. For instance, the network switching device can be a network switch, which directs IP packets based on the ports of the switch that receive the packets, or a network router, which directs IP packets based on header information contained in the packets.

Long term storage 112 also communicates with the networks 102, 104 and thus with the switching device 110. By way of example, long term storage 112 can be a storage area network (SAN) or network attached storage (NAS). Long term storage 112 receives IP packets, such as IP packets associated with a communication that is to be recorded, and stores information corresponding to the IP packets so that the recorded communications can be replayed. By way of example, in some embodiments in which the communications involve voice communications, received IP packets could be converted to audio files for storage, or the IP packets themselves could be stored. Notably, various other types of communications could be involved, such as email, chat and/or corresponding screens of data that are displayed during such communications. Clearly, the switching device could forward raw IP packets or re-ordered IP packets (i.e., IP packets arranged for conversion to a file type such as an audio file).

Figure 2:
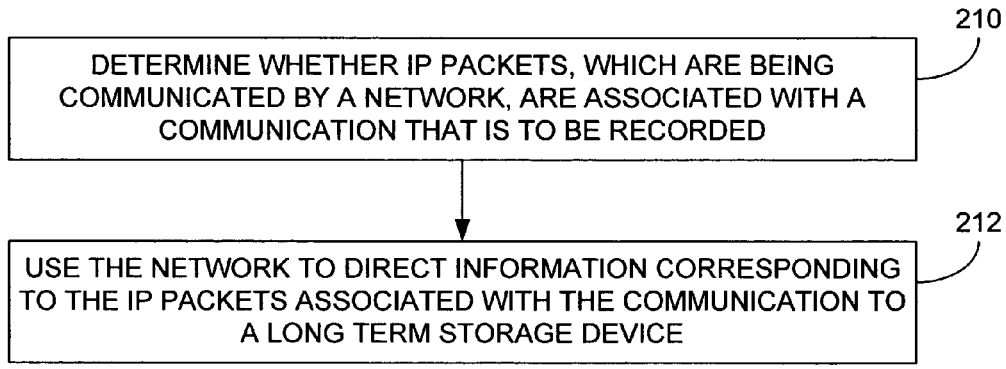
FIG. 2 is a flowchart illustrating functionality (or method steps) that can be performed by the embodiment of FIG. 1.

FIG. 2 is a flowchart illustrating functionality (or method steps) that can be performed by the system 100 of FIG. 1. In particular, as depicted in block 210, a determination is made as to whether Internet Protocol (IP) packets, which are being communicated by a network, are associated with a communication that is to be recorded. By way of example, in some embodiments a switching device can be used, such as switching device 110, which can be a network router or a network switch.

In determining whether IP packets are associated with a communication that is to be recorded, various techniques can be used. By way of example, embodiments of such a system can incorporate one or more of receiving, filtering, analyzing and storing of the IP packets. In this regard, it should be noted that an IP packet (which can be of various IP versions, e.g., IPv4, Ipv6) incorporates three basic elements, i.e., a header, a data area, and a trailer. The header designates the beginning of the packet, the data area includes the data payload, and the trailer designates the end of the packet.

In some embodiments, the determining step mentioned above can include analyzing of one or more of the three basic elements of the IP packets received by the system. By way of example, some embodiments can operate in a promiscuous mode, in which each packet received is read in its entirety. Thus, in some embodiments, the device(s) of the system associated with performing the determining step can capture and save the packets for analysis.

Additionally or alternatively, such a system can operate in monitor mode, in which the device(s) of the system associated with performing the determining step wirelessly receive the packets and then act on the packets in a manner similar to the promiscuous mode.

Additionally or alternatively, such a system can operate in non-promiscuous (or normal) mode, in which the device(s) of the system associated with performing the determining step check the address of the packet and merely forward the packet to a next device if the packet is not of interest. Thus, these embodiments perform a type of filtering.

Referring back to FIG. 2, regardless of the manner in which the IP packets for recording are determined, in block 212, the IP packets associated with the communication are directed to a long term storage device that is connected to the network. By way of example, long term storage 112 can be such a device.

Figure 3:
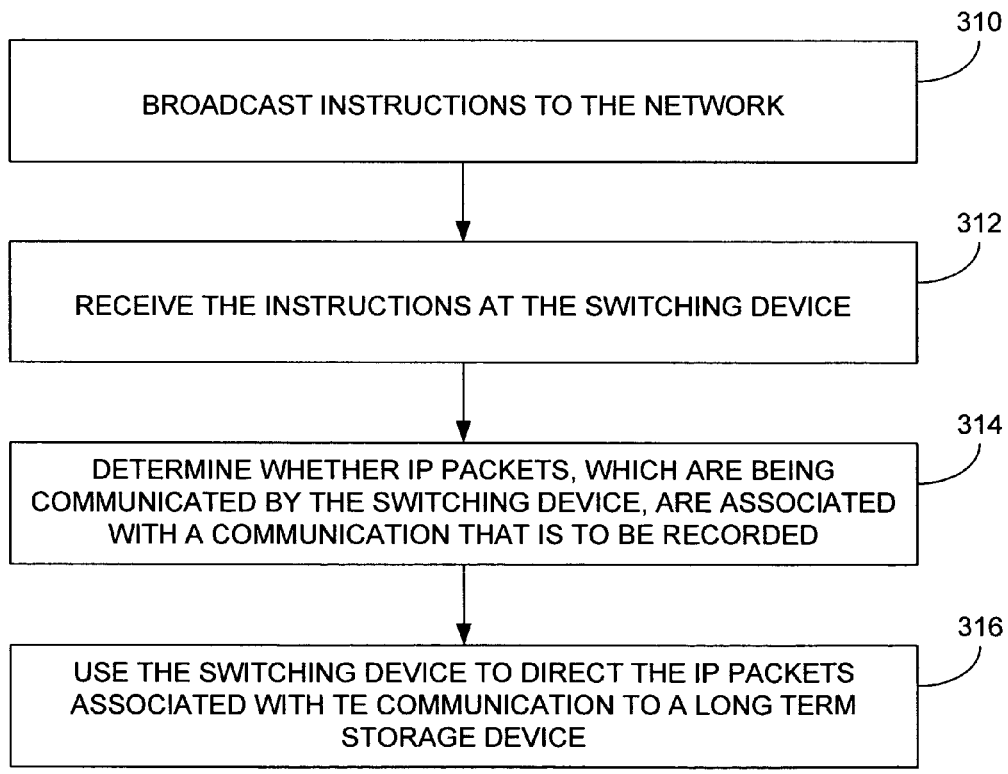
FIG. 3 is a flowchart illustrating functionality (or method steps) that can be performed by another embodiment of a system for providing recording as a network service.

FIG. 3 is a flowchart illustrating functionality (or method steps) that can be performed by another system for providing recording as a network service. In particular, as depicted in block 310, instructions are provided to the network such as via broadcast, multicast, socket connection or other communication transport. The instructions indicate that IP packets associated with desired communications are to be directed to long term storage. For instance, the instructions may indicate that the following exemplary communications are to be recorded: those originating from a particular source; those including a particular source as a party to the communication; those exceeding a particular duration; and those having associated metadata such as ANI or DNIS. Clearly, these types of communications can potentially be identified by information provided with the IP packets used in facilitating the communications. However, other events also can be used to initiate recording. For example, when communications are associated with a contact center, various computer applications may be used in concert with a voice communication, e.g., Voice over IP (VoIP) communication, in order to facilitate an interaction between a contact center agent and a customer. In such a scenario, various triggers provided by one or more of the applications could be used to initiate recording. For instance, when a teleset/softphone is used, a request for recording the voice communication associated with that application could be encoded in instructions that are sent to the network via broadcast, multicast, socket connection or other communication transport.

In block 312, the instructions are received at the switching device. In block 314, a determination is made as to whether Internet Protocol (IP) packets, which are being communicated by the switching device, are associated with a communication that is to be recorded. Notably, the particular communication and/or the criteria for determining whether the communication is to be recorded are contained in the instructions. In block 316, the switching device is used to direct the IP packets associated with the communication to long term storage.

In contrast to conventional methods of recording that use dedicated recorders for tapping communications, using a switching device potentially reduces the latency associated with buffering IP packets in such a recorder prior to the recorder directing the captured data to long term storage. That is, in some embodiments, a switching device may not perform a buffering function at all, instead directing IP packets associated with communications that are to be recorded directly to a network-connected long term storage device without first buffering the packets. In other embodiments, however, some form of buffering could be provided by the switching device depending upon its particular configuration.

Additionally, by streaming information for recording directly to network attached storage, optimal usage of hard disks may be achieved. This is because hard disks used for storage typically are sized for expected load even though such load is difficult to predict. By sharing the hard disks attached to the network, the potential of a single hard disk being over used is diminished.

It should be noted that, in contrast to the embodiment described above with respect to FIG. 3, some embodiments may be provided with instructions for controlling recording by methods other than network broadcast instructions. For instance, the instructions could be directly provided to a switching device and/or provided to the switching device prior to interconnecting the switching device with the network.

Figure 4:
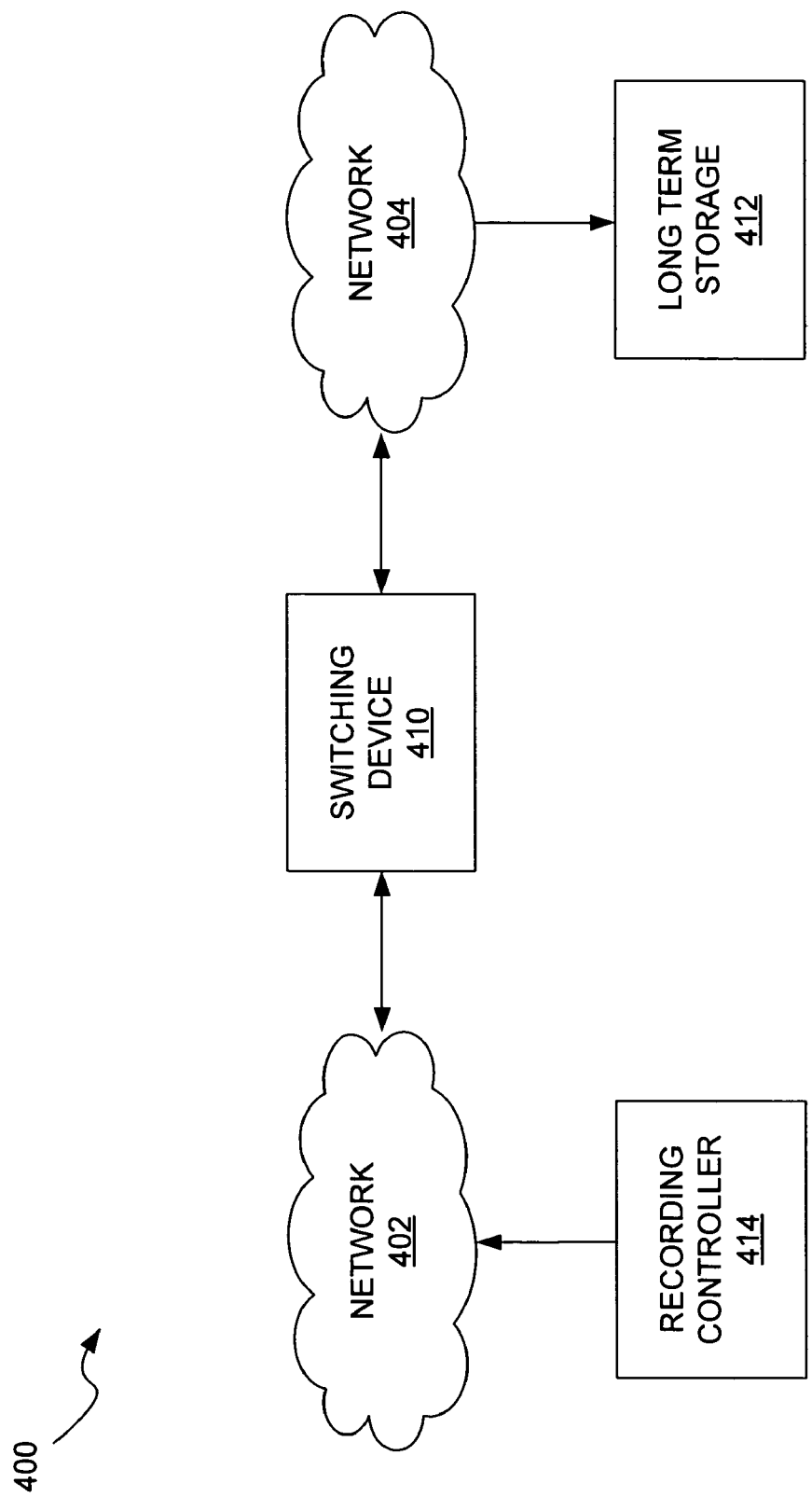
FIG. 4 is a schematic diagram illustrating another exemplary embodiment of a system for providing recording as a network service.

FIG. 4 is a schematic diagram illustrating another exemplary embodiment of a system for providing recording as a network service. As shown in FIG. 4, system 400 incorporates communications networks 402 and 404. Each of these networks can be any or a combination of network types (WAN, LAN, the Internet) for providing Internet Protocol (IP) communications.

Communicating with each of networks 402 and 404 is a network switching device 410 that can be used for directing IP packets. Long term storage 412 communicates with the networks 402, 404 and thus with the switching device 410. Long term storage 412 receives IP packets, such as IP packets associated with a communication that is to be recorded, and stores information corresponding to the IP packets so that the recorded communications can be replayed. In some embodiments, such information could include an identification of the source (e.g., source address), an identification of the destination (e.g., destination address), identification of an agent that is a party to the communication, machine name and/or called phone number, for example.

As shown in FIG. 4, recording controller 414 also is provided. In this embodiment, the recording controller coordinates activity with the switching device to ensure that the desired communications are recorded. In particular, the recording controller can provide instructions to the switching device so that the communications to be recorded can be identified. This can be accomplished by a user interacting with a user interface of the recording controller. Such a user interface enables a user to provide input regarding criteria used for determining whether communications are to be recorded. The recording controller then converts the input into instructions that can be provided to the switching device by broadcast, for example.

Additionally or alternatively, duplicate recording of information can potentially be avoided. In some embodiments, this can be accomplished by permitting the storage devices to communicate with each other regarding recording activity. This could be facilitated via a network protocol. In other embodiments, a recording controller could be used to track the recording activity of the recording devices and to direct the recording activity. By way of example, the recording controller could inform the network about the recording device(s) that should be used for recording.

Figure 5:
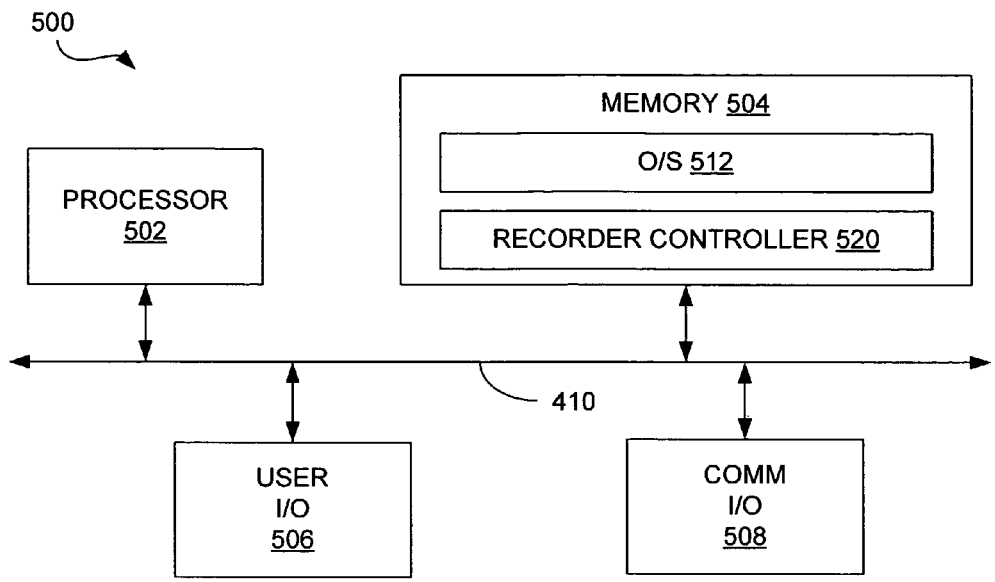
FIG. 5 is a schematic diagram illustrating an embodiment of a computer-implemented device that is configured to perform the functionality associated with a recorder, such as the recorder used in the embodiment of FIG. 4.

FIG. 5 is a schematic diagram illustrating an embodiment of a computer-implemented device that is configured to perform the functionality associated with a recording controller. Generally, in terms of hardware architecture, computer 500 includes a processor 502, memory 504, a user interface 506, and one or more input and/or communication (I/O) device interface(s) 508 that are communicatively coupled via a local interface 510. The local interface can include, for example but not limited to, one or more buses or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The processor 502 may be a hardware device for executing software, particularly software stored in memory 504. In this regard, the processor can be a custom made or commercially available processor, a central processing unit (CPU), an auxiliary processor among several processors associated with the recorder, a semiconductor based microprocessor (in the form of a microchip or chip set), a macroprocessor, or generally any device for executing software instructions.

The memory 504 can include one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory may incorporate electronic, magnetic, optical, and/or other types of storage media. Note that the memory can have a distributed architecture, where various components are situated remote from one another, but can be accessed by the processor. Additionally, the memory can include an operating system 512, as well as instructions associated with a recording controller 520.

The software in memory may include one or more separate programs, each of which includes an ordered listing of executable instructions for implementing logical functions. The operating system can be configured to control the execution of other computer programs and provides scheduling, input-communication control, file and data management, memory management, and communication control and/or related services.

It should be noted that a system component embodied as software may also be construed as a source program, executable program (object code), script, or any other entity comprising a set of instructions to be performed. When constructed as a source program, the program is translated via a compiler, assembler, interpreter, or the like, which may or may not be included within the memory, so as to operate properly in connection with the operating system.

When the computer 500 is in operation, the processor is configured to execute software stored within the memory, to communicate data to and from the memory, and to generally control operations of the recorder pursuant to the software. Software in memory, in whole or in part, is read by the processor, perhaps buffered, and is then executed. In this regard, when executing instructions associated with the recording controller, the exemplary functionality described above with respect to recording controllers may be performed.

Figure 6:
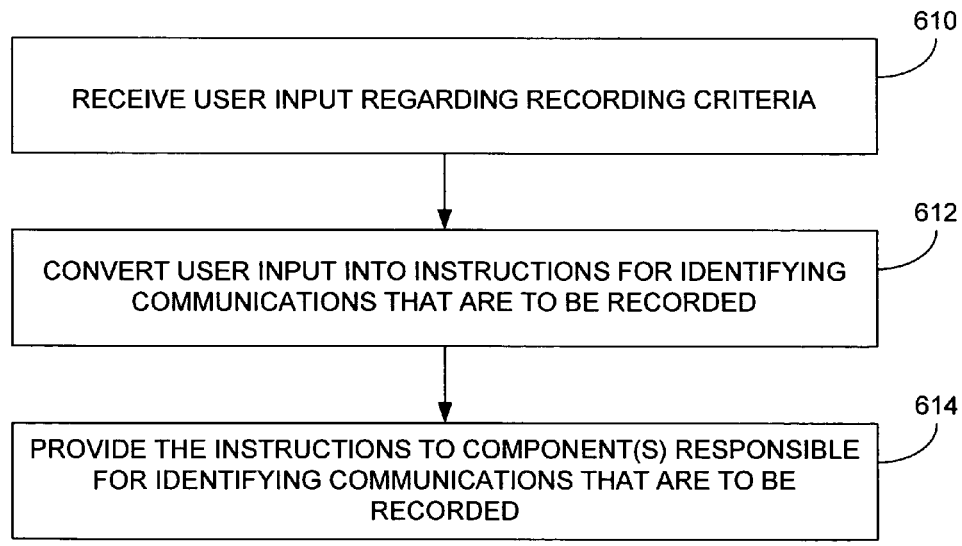
FIG. 6 is a flowchart illustrating functionality (or method steps) that can be performed by the embodiment of FIG. 5.

FIG. 6 is a flowchart illustrating functionality (or method steps) that can be performed by a recording controller, such as the embodiment of FIG. 5. In particular, the functionality may be construed as beginning at block 610, in which user input regarding criteria used for determining whether communications are to be recorded is received. In block 612, the user input is convert into instructions that are operative to enable identification of a communication that is to be recorded. In block 614, the instructions are provided to a component that will be responsible for identifying communications that are to be recorded, such as to a switching device or recorder. Notably, the instructions can be provided in various manners, such as via network broadcast or direct communication to a selected IP address.

Figure 7:
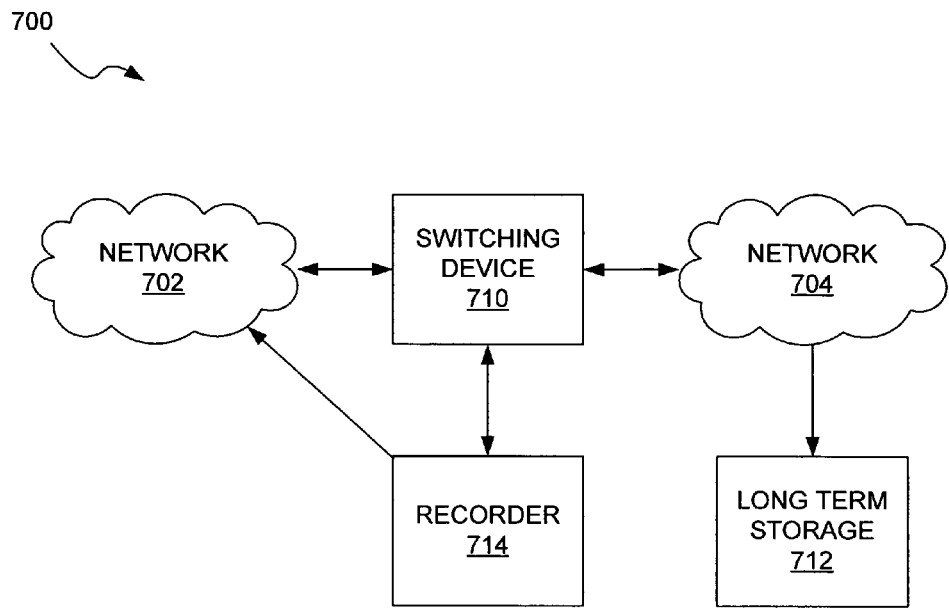
FIG. 7 is a schematic diagram illustrating another exemplary embodiment of a system for providing recording as a network service.

FIG. 7 is a schematic diagram illustrating another exemplary embodiment of a system for providing recording as a network service. As shown in FIG. 7, system 700 incorporates communications networks 702 and 704. Each of these networks can be any or a combination of network types (WAN, LAN, the Internet) for providing Internet Protocol (IP) communications.

Communicating with each of networks 702 and 704 is a network switching device 710 that can be used for directing IP packets. Long term storage 712 communicates with the networks 702, 704 and thus with the switching device 710. Long term storage 712 receives IP packets, such as IP packets associated with a communication that is to be recorded, and stores information corresponding to the IP packets so that the recorded communications can be replayed. Notably, the IP packets received can be copies or some other interpretation of the original IP packets, thereby ensuring that the original packets continue to be routed as desired.

As shown in FIG. 7, a recorder 714 also is provided. In this embodiment, the recorder coordinates activity with the switching device to ensure that the desired communications are recorded. In particular, the recorder can provide one or more of the following functions: instructing the switching device about the communications that are to be recorded; identifying which of the IP packets of the switching device are to be directed for recording; and directing identified IP packets to long term storage.

In some embodiments, the recorder determines which of the IP packets are to be recorded based on the tapping of the switching device and then directs the switching device to direct those packets for long term storage. In other embodiments, responsive to determining which of the IP packets are to be recorded based on the tapping of the switching device, the recorder transmits those packets back to the switching device so that those packets can be directed by the switching device to long term storage.

In such an embodiment, the recorder is somewhat similar to a conventional recorder in that the recorder taps communications. However, unlike a conventional recorder, the recorder of FIG. 7 may not be implemented with an ability to store IP packets locally for the purpose of manipulating, e.g., re-ordering, the packets. That is, in contrast to conventional recorders that buffer IP packets prior to directing those packets to a long term storage device so that the packets can be re-ordered, some embodiments of the recorder selectively direct IP packets to long term storage by re-transmitting the packets to the switching device without re-ordering those packets into a segment of a communication. In other embodiments, however, the IP packets can be held in memory, e.g., volatile memory, while some form of ordering and/or interpretation of the information contained in the IP packets takes place.

Figure 8:
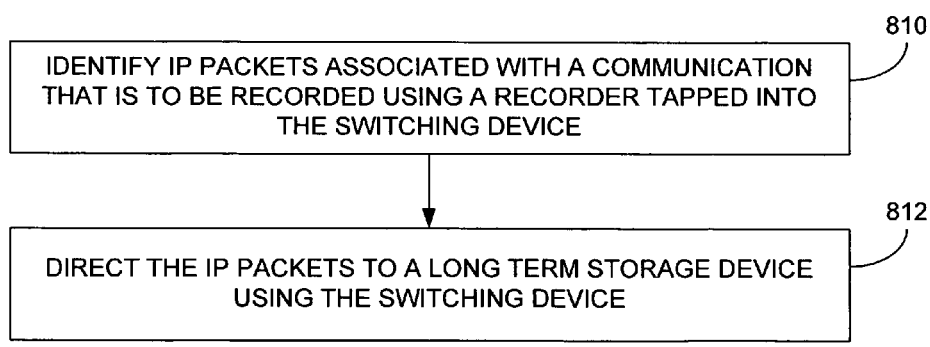
FIG. 8 is a flowchart illustrating functionality (or method steps) that can be performed by the embodiment of FIG. 7.

FIG. 8 is a flowchart illustrating functionality (or method steps) that can be performed by a system, such as the embodiment of FIG. 7. In particular, the functionality may be construed as beginning at block 810, in which IP packets associated with a communication that is to be recorded are identified by a recorder that is tapped into a switching device. In block 812, the IP packets are directed to long term storage device with the switching device.

It should be noted that any of the executable instructions, such as those depicted functionally in the accompanying flowcharts, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non-exhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of embodiments of this disclosure can include embodying the functionality described in logic embodied in hardware or software-configured media.

It should also be noted that the flowcharts included herein show the architecture, functionality and/or operation of implementations that may be configured using software. In this regard, each block can be interpreted to represent a module, segment, or portion of code, which comprises one or more executable instructions for implementing the specified logical function(s). It should also be noted that in some alternative implementations, the functions noted in the blocks may occur out of the order depicted. For example, two blocks shown in succession may in fact be executed substantially concurrently or the blocks may sometimes be executed in the reverse order, depending upon the functionality involved.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure.

Therefore, at least the following is claimed:

1. A method for providing recording of communications comprising:
    providing recording as a service on a network such that:
    the network determines whether Internet Protocol (IP) packets, which are being communicated by the network, are associated with a communication that is to be recorded, the communication comprising one of audio, email, chat or screen displays;
    instructions indicating that identification information corresponding to the IP packets associated with the communication are to be directed to a plurality of network attached long term storage devices;
    the network directs identification information corresponding to the IP packets associated with the communication to the network attached long term storage devices so that a recorded communication can be replayed; and
    providing a switching device with instructions regarding communications such that identification information corresponding to the IP packets and satisfying criteria associated with the instructions is directed to the plurality of network attached long term storage devices,
    wherein determining whether the IP packets are associated with a communication that is to be recorded is accomplished by the switching device of a network, the switching device being a network infrastructure component configured for directing the IP packets, and wherein the plurality of network attached storage devices communicate with a recording controller to exchange information regarding recording activity.

2. The method of claim 1, wherein the switching device determines whether the IP packets are associated with the communication that is to be recorded.

3. The method of claim 2, wherein, in determining whether IP packets are associated with a communication that is to be recorded, the switching device receives the IP packets in a promiscuous mode.

4. The method of claim 1, wherein, in determining whether IP packets are associated with a communication that is to be recorded, the IP packets are filtered.

5. The method of claim 4, wherein the switching device filters the IP packets by operating in a non-promiscuous mode.

6. The method of claim 1, wherein, in determining whether IP packets are associated with a communication that is to be recorded, the switching device analyzes at least some of the IP packets received, with a portion of each of those IP packets being analyzed.

7. The method of claim 1, wherein, in determining whether IP packets are associated with a communication that is to be recorded, the switching device analyzes all of the IP packets received.

8. The method of claim 1, wherein the IP packets associated with the communication contain audio data.

9. The method of claim 1, wherein the IP packets associated with the communication contain video data.

10. The method of claim 1, wherein the IP packets associated with the communication contain screen data captured from a computing device.

11. The method of claim 1, wherein at least some of the instructions are provided to the switching device via the network.

12. The method of claim 1, further comprising:
    receiving the IP packets associated with the communication at the network attached long term storage device.

13. The method of claim 12, further comprising:
receiving information corresponding to the IP packets at the plurality of network attached long term storage devices.

14. The method of claim 13, wherein the information corresponding to the IP packets comprises at least one of a source of the communication and a destination of the communication.

15. The method of claim 13, further comprising reconstructing the communication for replay.

16. The method of claim 1, wherein a recorder, which is in communication with the switching device, determines whether the IP packets are associated with the communication that is to be recorded.

17. The method of claim 16, wherein:
the network comprises a switching device operative to direct the IP packets;
the IP packets are provided to the recorder, which is tapped into the switching device; and
the IP packets that are to be directed to the plurality of network attached long term storage devices by the switching device are retransmitted from the recorder.

18. The method of claim 1, wherein the service resides on the network and is accessible to a user via the network for requesting recording services.

19. The method of claim 18, wherein the recording services are accessible via a web browser.

20. The method of claim 19, wherein the web browser uses HTML.

21. A system for providing recording as a network service comprising:
a switching device operative to:
communicate Internet Protocol (IP) packets of a network with which the switching device is associated;
receive instructions regarding communications via the network such that IP packets satisfying criteria associated with the instructions are directed to a plurality of network attached long term storage devices, the communications comprising one of audio, email, chat or screen displays, and the instructions being derived in accordance with one of a source of the communication, a duration of the communication or metadata associated with the communication;
determine which of the IP packets communicated by the switching device are associated with a communication that is to be recorded; and
direct identification information corresponding to the IP packets associated with the communication to the network attached long term storage devices so that recorded communications can be replayed,
wherein the switching device is a network infrastructure component configured for directing IP packets, and wherein the plurality of network attached storage devices communicate with a recording controller to exchange information regarding recording activity.

22. The system of claim 21, further comprising means for facilitating identification of the IP packets associated with the communication.

23. The system of claim 21, further comprising a recorder tapped into the switching device, the recorder being operative to facilitate identification of the IP packets associated with the communication.

24. The system of claim 23, wherein the recorder is operative to transmit the IP packets for recording back to the switching device such that the switching device directs the IP packets transmitted from the recorder to plurality of network attached long term storage devices.

25. The system of claim 21, wherein the switching device is operative to receive the instructions from a recorder, which is tapped into the switching device.

* * * * *